E. M. FORBES.
DOOR MAT.
APPLICATION FILED JULY 23, 1912.
Reissued Aug. 27, 1912.
13,460.
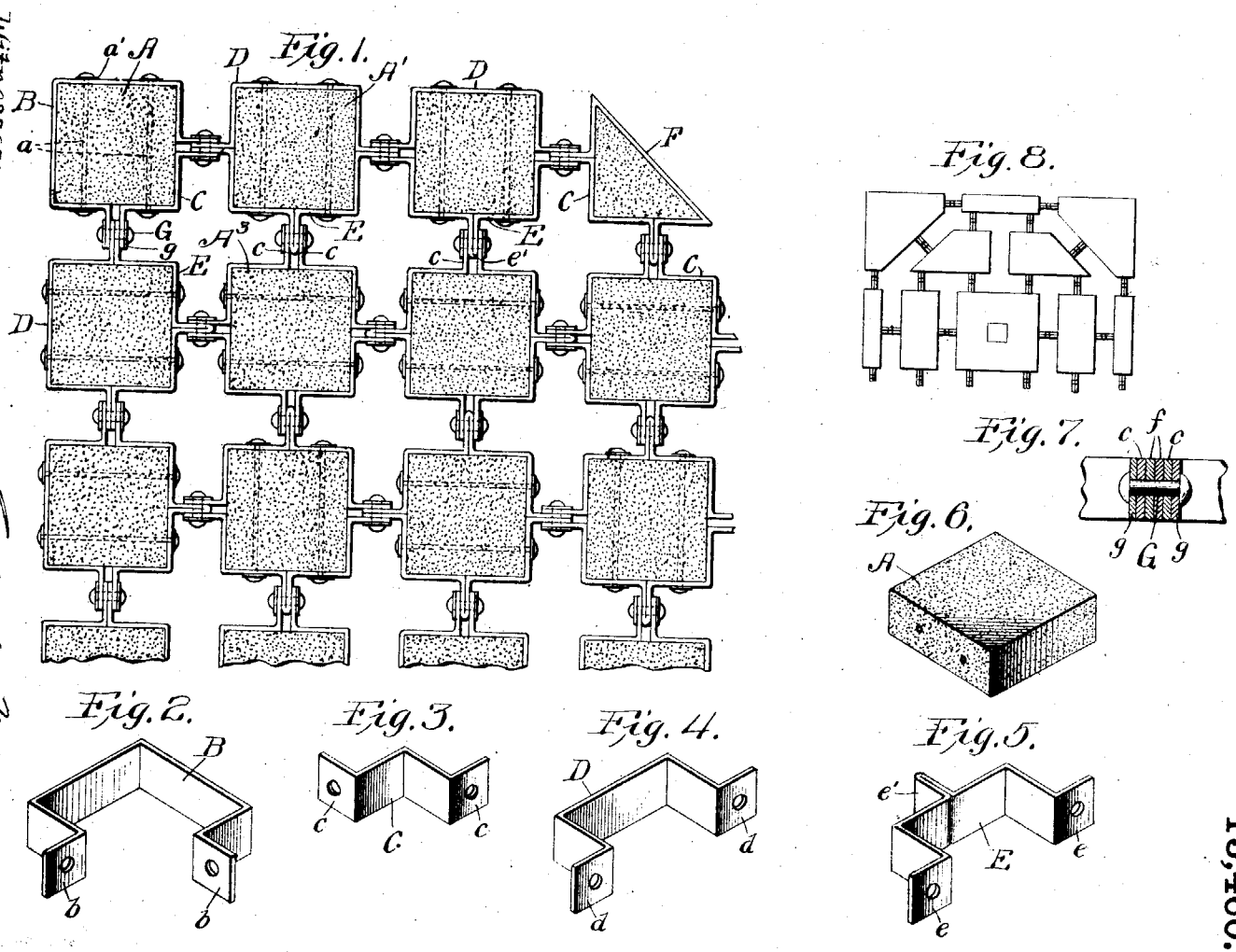
Witnesses:
Harry S. Gaither
Henry A. Parks
Ewing M. Forbes Inventor:
By Stanton Hatfield Scott & Chalmers
Attys.

UNITED STATES PATENT OFFICE.

EWING M. FORBES, OF CHICAGO, ILLINOIS.

DOOR-MAT.

13,460. Specification of Reissued Letters Patent. Reissued Aug. 27, 1912.

Original No. 1,028,871, dated June 11, 1912, Serial No. 642,747. Application for reissue filed July 23, 1912. Serial No. 711,610.

*To all whom it may concern:*

Be it known that I, EWING M. FORBES, a citizen of the United States, residing at Chicago, in the county of Cook and State of Illinois, have invented certain new and useful Improvements in Door-Mats, of which the following is a specification.

My invention relates in general to floor coverings, and more particularly to removable mats for use on door-steps, automobiles, etc.

It is desirable that door-mats and similar surface coverings should not only remove the mud and dirt from shoes, but should afford a secure footing, and should also be easily removable to permit cleaning. The surfaces which it is desired to cover are often irregular in shape, and hence it is desirable that the structure of the mat should be such as to permit it to be made of the requisite size and shape to conform to the surface to be covered.

The primary object of my invention is to provide a mat or floor covering which may be easily removed to permit cleaning of the underlying surface; which will remove the dirt from the shoes and at the same time afford a secure footing; which will itself be practically self-cleaning; and which will be durable in usage.

A further object of my invention is to provide a mat of such construction that it may be made of any desired size and shape to correspond to the surface to be covered, and which may be composed of different sizes and forms of parts, which may be either fancy blocks or letters.

A still further object of my invention is to provide a mat or the like, which will be simple in construction, inexpensive in manufacture and efficient in use.

My invention will be more fully disclosed hereinafter with reference to the accompanying drawings, in which the same is illustrated as embodied in a convenient and practical form, and in which—

Figure 1 is a plan view of a portion of one form of mat embodying my invention. Figs. 2, 3, 4 and 5 are detail perspective views of the different forms of frames for surrounding the individual elements of my improved mat. Fig. 6 is a perspective view of one of the individual blocks used in forming my improved mat. Fig. 7 is an enlarged sectional detail view on line 7, Fig. 1. Fig. 8 is a plan view of a modified design of mat also embodying my invention.

The same reference characters are used to designate the same parts in the several figures of the drawing.

My improved mat comprises a plurality of individual elements pivotally connected to each other so as to permit the mat to be readily folded or rolled up to permit the underlying surface to be cleaned, or when the mat is not in use. Each of the elements of my improved mat comprises a surrounding metal frame in which is inclosed a block of suitable material, such, for instance, as a composition of wool felt, asphaltum, and gilsonite.

Reference character A indicates each of the blocks which is secured within a surrounding frame, preferably formed of strips of sheet steel. The frames are of different shapes, according to the position of the individual blocks in the mat and according to the contour desired for the mat. The sheet metal frames of the individual elements are provided with lugs or ears which are pivotally connected to the lugs or ears on the adjacent elements forming the mat.

When the corner of the mat is to be rectangular, as shown at the left of Fig. 1, a frame such as shown in Figs. 2 and 3 is employed to surround the block A. The main member B of the frame is bent so as to entirely surround two sides of the block and to extend half way around the other two sides of the block. The other member C of the frame is formed to fit around one corner of the block and to be secured to the main portion B of the frame to completely surround the block A.

The portion of the frame B is provided with outwardly extending integral flanges *b b* while the smaller portion of the frame C is provided with corresponding flanges *c c*. A pivot pin G extends through registering holes in the adjacent flanges *b* and *c* and also through similar flanges on the frame of an adjacent block in the mat. Washers, such as shown at *g g* in Fig. 7, are preferably provided, over which the ends of the pivot pin are headed.

The block A′ adjoining the block A in Fig. 1 comprises a frame member D, shown in Fig. 4, and a complemental frame portion E, shown in detail in Fig. 5. The parts D and E surround the block and are secured together by means of pins extending through registering openings in the adjacent flanges *d* and *e*. The portions D and E forming the frame around the block A are of such size that the flanges lie close together and fit within the flanges on the adjacent side of the frame around the block A, the pivot pin G serving not only to connect together the two portions of the frames around each of the blocks, but also to pivotally connect the frames and inclosed blocks constituting adjacent elements of my improvement.

The frame part E is provided with a flange *e'* projecting outwardly at right angles to the flanges *e e*, which is adapted to extend within the flanges on the parts of the frame surrounding the adjacent block $A^3$, a single pivot pin serving to connect the flanges *e e* on the adjacent portions of the frame around the block $A^3$ with the interposed flange *e'*.

It will be readily evident from an inspection of Fig. 1 that by pursuing the above described method, a mat of any size may be made by forming individual elements and pivotally connecting them to each other. When the contour of the surface to be covered by the mat is irregular, the mat may be constructed to conform therewith, as for instance by employing one or more blocks comprising a frame such as indicated at F in conjunction with one of the corner frame portions C, thereby forming an element of triangular shape.

Each of the blocks is secured within its surrounding frame by any suitable fastening means, rods *a* being preferably employed, which extend through the inclosed block and through openings in the surrounding frame, the projecting ends of the rods being headed over and washers *a'* being preferably interposed between the heads and adjacent surfaces of the metal frame. The rods *a* not only serve to secure the block within the surrounding frame of each element, but serve to connect the parts of the frame together. In constructing my improved mat the elements are first individually assembled and then pivotally connected together so as to form a mat of the desired size and shape. It is therefore necessary that the parts constituting each element should first be secured together in order that the element may be in a condition to be assembled with the other elements. The rods *a* therefore perform two important functions, first, that of securing parts of the frame together so that their outwardly projecting flanges may be retained in proper relation to each other and held in such positions that they may be pivotally connected with the flanges of adjacent elements, and, second, that of retaining the block within the surrounding frame in each element so that when the mat is completed the blocks may be securely retained in proper position to effectively clean the shoes.

It will be evident that my improved construction of mat admits of the formation of mats of any desired size and shape which may be easily rolled or folded into a compact form through the medium of the lines of pivotal connections between the adjacent individual blocks. In the arrangement shown in Fig. 1 the mat may be folded in either direction, thereby rendering it possible to conveniently remove a mat by folding it either in the direction of its length or width.

It will be evident that in lieu of employing rectangular elements, elements of various shapes may be employed, as, for instance, the arrangement shown in Fig. 8. The pivotal connection of each individual element with the adjacent elements imparts to the mat such flexibility that it may be readily folded or rolled up, even when irregular blocks are employed. It will also be evident that if desired the blocks may have the form of letters and be so arranged as to spell words, as, for instance, the names of the buildings or stores where they are used. The composition of which the blocks are formed may be colored so that the mat may have a variety of colors, and by properly arranging the colored blocks artistic designs may be made.

From the foregoing description it will be observed that I have invented an improved mat or floor covering capable of a variety of uses, in fact anywhere where it is desired to use a mat. The strips of sheet steel of which the frame surrounding the individual blocks are formed afford sharp edges to scrape or remove the dirt and mud from the shoes, while the composition of the material of which the blocks are formed serves to wipe the soles of the shoes as they pass over the mat. My improved construction results in a strong and durable mat as well as one which may be conveniently placed in position and removed as occasion may desire.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. In a mat or floor covering, the combination with a plurality of individual elements, each comprising a surrounding frame composed of a plurality of parts having laterally projecting flanges, of pivot pins extending through registering holes in the adjacent flanges of the adjoining parts of a frame and also through the flanges on the corresponding parts of an adjoining frame, blocks of suitable material secured within the individual frames, and rods extending through each block and through holes in all the parts of the surrounding frame, whereby each element is individually assembled before being united to adjacent elements to form a mat.

2. In a mat or floor covering, the combination with corner elements each comprising a block and a surrounding frame composed of two parts having outwardly projecting registering flanges at their ends, one part merely extending around one corner of the block and a part extending around the rest of the periphery of the block, of a series of marginal elements intermediate of the corner elements each comprising a rectangular block and a surrounding frame composed of a plurality of parts, one of which extends along the outer surface of the block and around the adjacent corners thereof and provided at its ends with outwardly projecting flanges registering with similar flanges on the adjacent parts of the frame, central elements located within the corner and marginal elements each comprising a rectangular block surrounded by a frame having outwardly projecting flanges on each side, the flanges on all of the elements overlapping and registering with the adjacent flanges on the adjoining blocks, means for pivotally connecting the registering flanges on adjoining elements, and rods extending through each block and through registering holes in the parts of the surrounding frame for securing the block to all of the parts of the frame and also fastening the parts of the frame together, whereby each element is individually assembled before being pivotally connected to the other elements to form a mat.

In testimony whereof, I have subscribed my name.

EWING M. FORBES.

Witnesses:
GEO. L. WILKINSON,
HENRY A. PARKS.